(12) United States Patent
Verhee

(10) Patent No.: US 7,780,229 B2
(45) Date of Patent: Aug. 24, 2010

(54) VEHICLE SEAT WITH A STORAGE COMPARTMENT

(75) Inventor: Patrick Verhee, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 12/110,439

(22) Filed: Apr. 28, 2008

(65) Prior Publication Data

US 2008/0265634 A1    Oct. 30, 2008

(30) Foreign Application Priority Data

Apr. 28, 2007    (DE) .................. 10 2007 020 190

(51) Int. Cl.
*A47C 7/62*    (2006.01)
(52) U.S. Cl. ................. 297/188.21; 297/188.08; 297/188.13
(58) Field of Classification Search ............ 297/188.21, 297/188.08, 188.13
See application file for complete search history.

(56) References Cited

U.S. PATENT DOCUMENTS

| 333,853 | A | * | 1/1886 | Handy ........................ 297/146 |
| 1,401,660 | A | * | 12/1921 | White ........................ 224/563 |
| 3,088,771 | A | * | 5/1963 | Weigle ...................... 296/37.5 |
| 3,632,029 | A | * | 1/1972 | Sonner ........................ 224/275 |
| 5,340,183 | A | * | 8/1994 | Horian ....................... 296/24.4 |
| 5,795,005 | A | * | 8/1998 | Garfias et al. .............. 296/37.5 |
| 5,967,602 | A |  | 10/1999 | Ptak et al. |
| 6,053,553 | A |  | 4/2000 | Hespelt |
| 7,537,279 | B2 | * | 5/2009 | Pudney .................. 297/188.01 |

FOREIGN PATENT DOCUMENTS

DE              41 25 416        2/1993

* cited by examiner

*Primary Examiner*—Sarah B McPartlin
(74) *Attorney, Agent, or Firm*—Gregory P. Brown; Brooks Kushman P.C.

(57) ABSTRACT

A vehicle seat includes a seat frame having a seat portion and a cover skirt covering the frame below the seat portion to form a footwell termination at a front region of the cover skirt. The front region of the cover skirt includes a pair of side walls, a front wall, and a back wall. The side and front walls are articulately connected and the side walls are foldable and coupled between the front and back walls. The front wall is displaceable away from the back wall to a pulled-out position in which the side walls are unfolded and the side walls, the front wall, and the back wall together form a storage compartment. The front wall is displaceable toward the back wall to a pushed-in position in which the side walls are folded and lie between the front and back walls and the front and back walls meet.

8 Claims, 4 Drawing Sheets

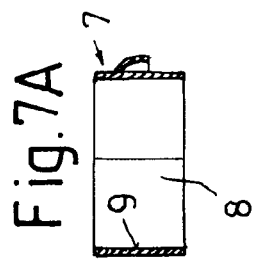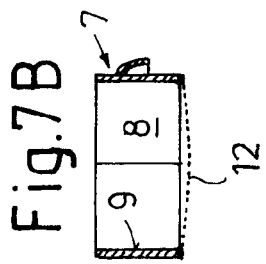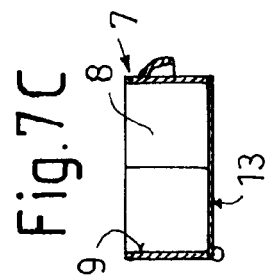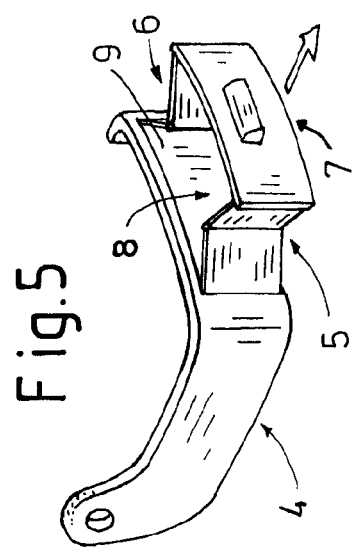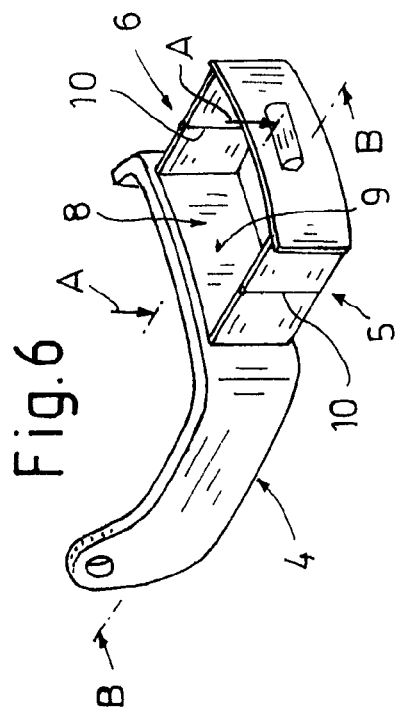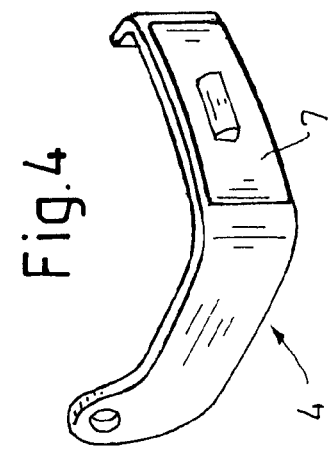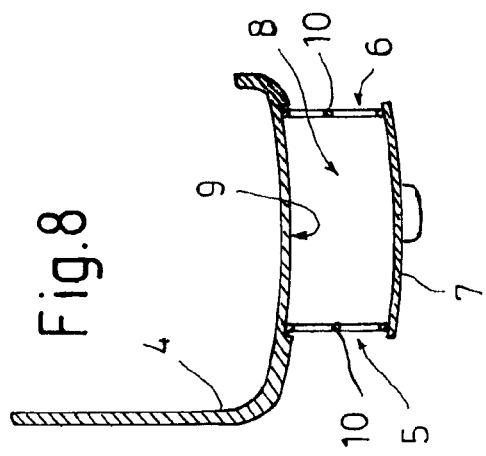

_US 7,780,229 B2_

VEHICLE SEAT WITH A STORAGE COMPARTMENT

CROSS-REFERENCE TO RELATED APPLICATIONS

This application claims foreign priority benefits under 35 U.S.C. §119(a)-(d) to DE 10 2007 020 190.9, filed Apr. 27, 2007, which is hereby incorporated by reference in its entirety.

BACKGROUND OF THE INVENTION

1. Field of the Invention

The present invention relates to a vehicle seat having a seat frame with a seat portion and a cover skirt for the seat frame.

2. Background Art

Many drivers drive alone when operating vehicles. A driver sitting alone in a vehicle in the front driver seat often places objects on the nearby front passenger seat. The objects are thus located reachably next to the driver and the vehicle trunk does not have to opened separately.

A problem is that an object placed on a seat has a tendency to drop off the seat during vehicle operations involving braking, accelerating, or cornering. This is a hazard as the driver reactively wants to hold moving objects and is thereby distracted from the roadway. Dropped objects may injure or startle the driver or other passengers or may become jammed in the brake pedal or the gas pedal.

WO 99/35001 A1 (corresponding to U.S. Pat. No. 5,967,602) describes a vehicle seat having a storage platform. The platform can be pulled out from and pushed into the seat frame. The platform includes a fixed base and a rising front edge. A problem is that, in addition to the platform lacking side walls, the seat has to be adapted to the platform (i.e., a push-in frame and corresponding space below or in the seat frame is required).

DE 41 25 416 C2 describes a vehicle seat having a storage compartment arranged between the seat and the floor panel. The compartment is closed and extends forward beyond the front edge of the seat and is drawn upward. This seat also has to be adapted to the compartment to correspondingly provide space between the seat and the floor panel.

However, if a change to the seat structure or its frame and the distance from the floor panel is undesirable for ergonomic reasons or the like, then these arrangements cannot be used.

DE 197 11 035 C1 (corresponding to U.S. Pat. No. 6,053,553) describes a device for dividing a trunk. The device includes articulately connected partitions rising from the trunk floor of which two partitions are coupled to the free end in each case of a wall rising vertically from the trunk floor, and one partition can be displaced approximately at right angles to the trunk wall.

SUMMARY OF THE INVENTION

An object of the present invention includes a vehicle seat having a storage compartment which does not require altering the seat frame, the seat height, or the space below the seat.

In carrying out the above object and other objects, the present invention provides a seat for a vehicle. The seat includes a seat frame and a cover skirt. The seat frame includes a seat portion. The cover skirt covers the seat frame below the seat portion to thereby form a footwell termination at a front end region of the cover skirt. The front end region of the cover skirt includes a pair of side walls, a front wall, and a back wall. The side walls and the front wall are articulately connected to one another and the side walls are foldable and coupled between the front wall and the back wall. The front wall is displaceable away from the back wall to a pulled-out position in which the side walls are unfolded and the side walls, the front wall, and the back wall together form a storage compartment. The front wall is displaceable toward the back wall to a pushed-in position in which the side walls are folded and lie between the front wall and the back wall and the front wall meets the back wall.

In an embodiment, the cover skirt includes in its front region a pair of side walls and a front wall. The side walls and the front wall are articulately connected together. The side walls are coupled to the free end of the cover skirt. The front wall can be displaced forward approximately at right angles to the cover skirt to thereby form a storage compartment with the side walls. As a result, the footwell in front of the seat (such as a front passenger seat) can be used as a protected storage space. Modifying the seat frame to accommodate for the storage compartment is thereby not required. The footwell, which in any case is generally free, becomes the storage space in a simple manner without the seat frame having to be changed. Only the cover skirt is correspondingly changed. However, this is more cost-effective and less complicated.

The storage compartment which can thus be formed by being pulled out is therefore bounded by the walls and the vehicle floor. In particular, if the walls in the pushed-in position are arranged in a recess (back wall) of the cover skirt (i.e., accommodated in or aligned with the cover skirt in the pushed-in position without penetrating the seat frame) a visually attractive solution is provided.

In an embodiment, the side (lateral) walls of the storage compartment are foldable. For this purpose, each foldable wall has a vertically running folding point (e.g., a hinge).

In an embodiment, a base is connected together with the displaceable front wall and the cover skirt to form a storage compartment independent of the vehicle floor. Such a storage compartment can accommodate relatively small objects. For this purpose, the base of the storage compartment can be a net or a roller blind which can be pulled out over the displaceable front wall.

In an embodiment, a handle and/or a release mechanism is arranged on the displaceable wall. The storage compartment can therefore be pulled out and the respective position locked or released easily. An implementation of a "push-push mechanism", according to which the locking or release of the walls is triggered in each case by pressing, may also be used.

The above features, and other features and advantages of the present invention as readily apparent from the following detailed descriptions thereof when taken in connection with the accompanying drawings.

BRIEF DESCRIPTION OF THE DRAWINGS

FIG. 4 illustrates a schematic view of the front end region of the cover skirt in a folded-in position;

FIG. 5 illustrates a schematic view of the front end region of the cover skirt in a partially folded-out position;

FIG. 6 illustrates a schematic view of the front end region of the cover skirt in a fully folded-out position;

FIG. 7A illustrates a section along the line A-A of FIG. 6 in the region of the storage compartment;

FIG. 7B illustrates a section along the line A-A in FIG. 6 in the region of the storage compartment in accordance with another embodiment of the present invention;

FIG. 7C illustrates a section along the line A-A in FIG. 6 in the region of the storage compartment in accordance with another embodiment of the present invention; and FIG. 8 illustrates a section along the line B-B in FIG. 6 in the region of the storage compartment.

DETAILED DESCRIPTION OF THE PREFERRED EMBODIMENT(S)

Figure 1:
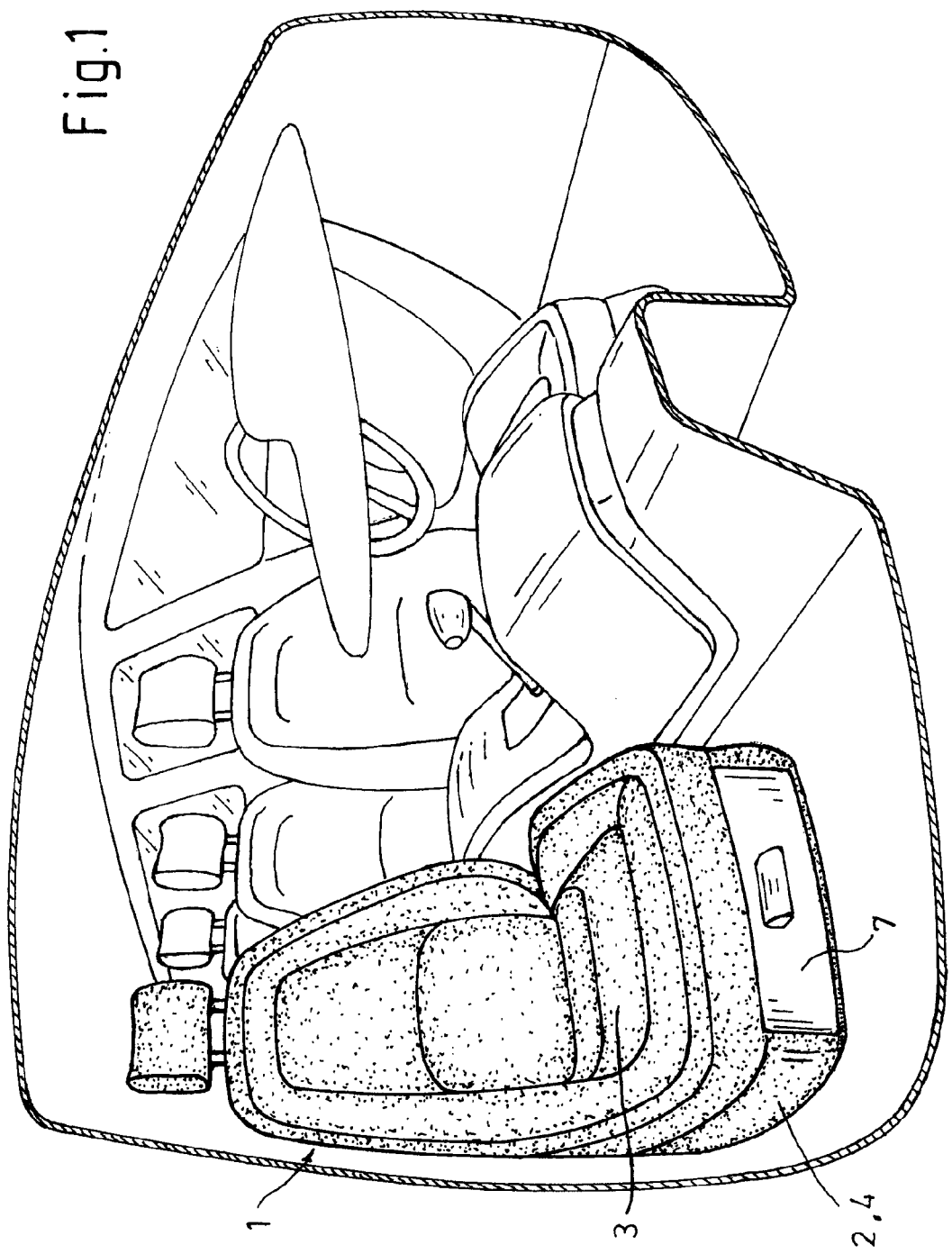
FIG. 1 illustrates a schematic perspective view of a vehicle seat having a cover skirt and a storage compartment in accordance with an embodiment of the present invention in which the storage compartment is in a pushed-in position.

Same reference numerals denote corresponding elements of the different embodiments illustrated in the Figures.

Figure 2:
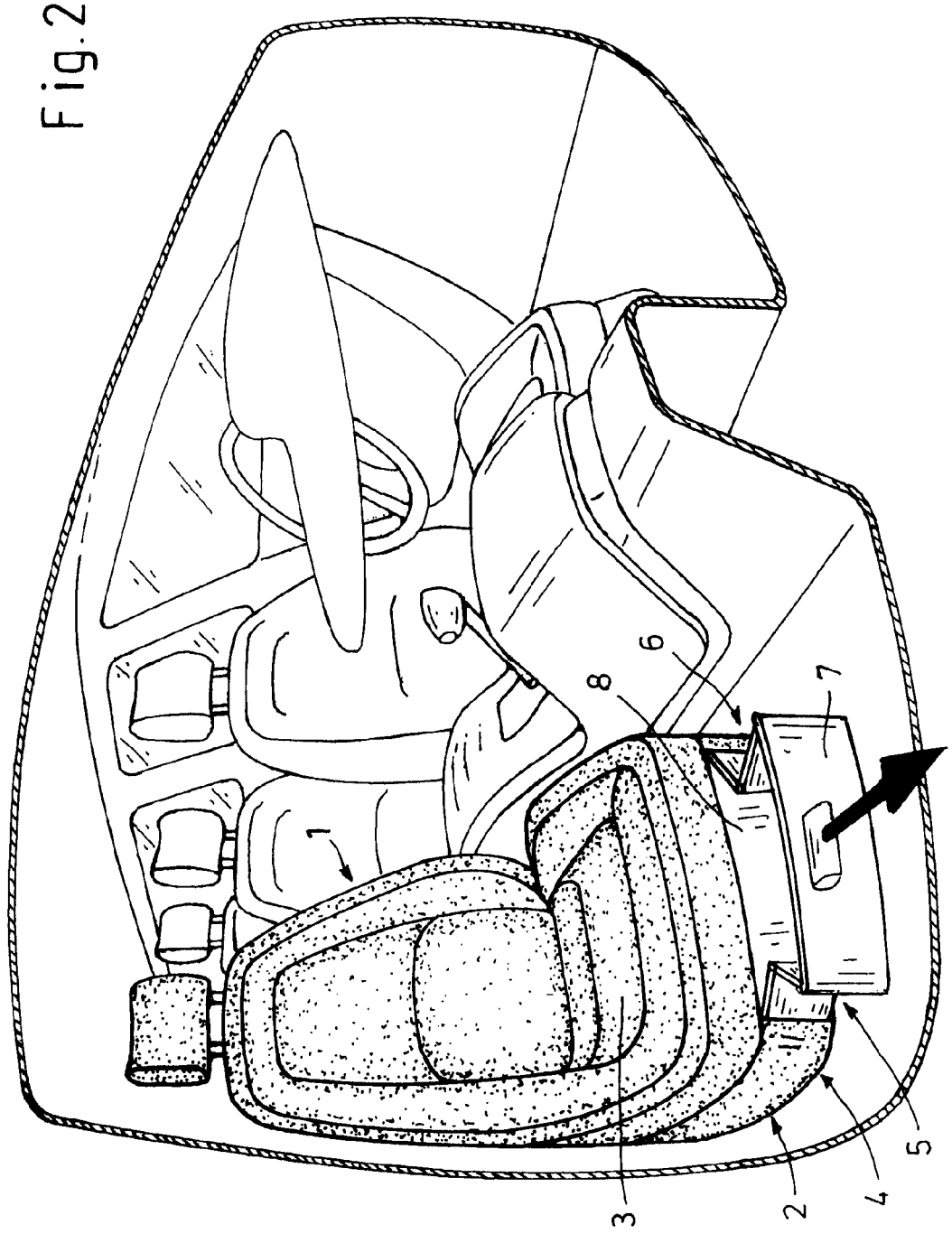
FIG. 2 illustrates a schematic perspective view of the seat in which the storage compartment is in a partially pulled-out position.
Figure 3:
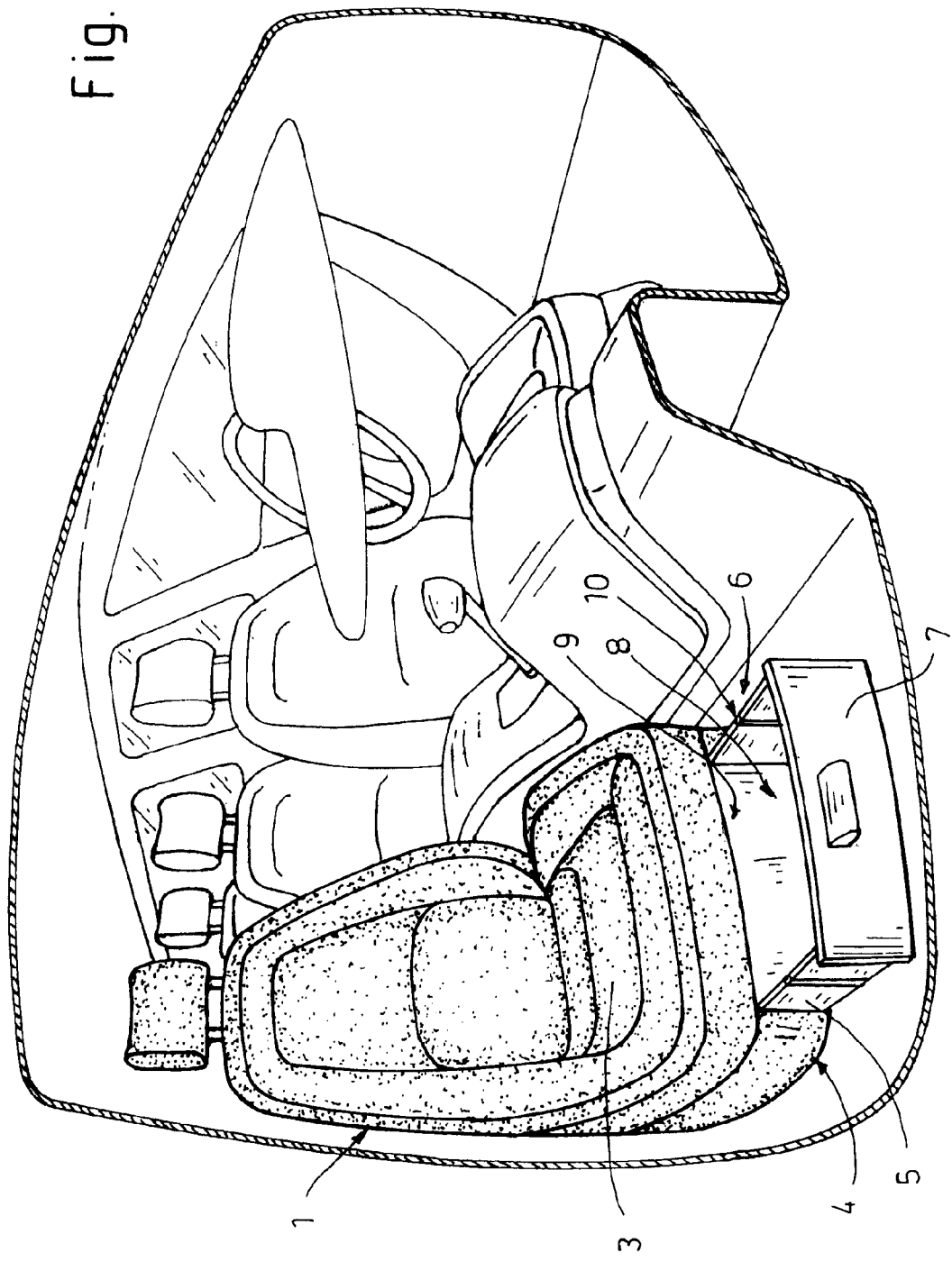
FIG. 3 illustrates a schematic perspective view of the seat in which the storage compartment is in a fully pulled-out position.

Referring now to FIGS. 1, 2, and 3, schematic perspective views of a vehicle seat 1 having a cover skirt 4 and a storage compartment 8 in accordance with an embodiment of the present invention are shown. Seat 1 is shown as a front passenger seat of a vehicle. Seat 1 includes a seat frame 2. A seat portion 3 rests on seat frame 2. Cover skirt 4 covers seat frame 2 below seat portion 3 in the manner of a skirt and thus forms a termination with respect to the footwell.

In general, storage compartment 8 is movable out from and towards seat frame 2. That is, storage compartment 8 can be pulled out from and pushed toward seat frame 2. FIG. 1 illustrates storage compartment 8 in a pushed-in position relative to seat frame 2. FIG. 2 illustrates storage compartment 8 in a partially pulled-out position relative to seat frame 2. FIG. 3 illustrates storage compartment 8 in a fully pulled-out position relative to seat frame 2.

Referring now to FIGS. 4, 5, and 6, with continual reference to FIGS. 1, 2, and 3, schematic views of cover skirt 4 are shown. Cover skirt 4 includes at its front end region a pair of opposite side walls 5, 6, a front wall 7, and a recess (back wall) 9. Side walls 5, 6 and front wall 7 are articulately connected to one another. Side walls 5, 6 are each coupled between front wall 7 and back wall 9.

Front wall 7 is movable in a forward direction out from back wall 9 (i.e., in the direction of the arrow in FIG. 2) approximately at right angles (on opposite ends of front wall 7) in order to form storage compartment 8. That is, when front wall 7 is moved forward out from cover skirt 4, side walls 5, 6, front wall 7, and back wall 9 together form storage compartment 8 which thereby is pulled-out relative to seat frame 2. In this manner, storage compartment 8 can be formed by pulling out front wall 7 and thereby pulling out side walls 5, 6. Storage compartment 8 therefore has lateral, front, and back delimitations respectively formed by side walls 5, 6, front wall 7, and back wall 9.

Likewise, front wall 7 is movable in a backward direction toward back wall 9 (i.e., in the opposite direction of the arrow in FIG. 2) approximately at right angles (on opposite sides of front wall 7) in order to place storage compartment 8 in its pushed-in position relative to seat frame 2. Side walls 5, 6 and front wall 7, in the pushed-in position of storage compartment 8, are arranged against recess (back wall) 9 of cover skirt 4. That is, front wall 7 is aligned with the surface of cover skirt 4 while side walls 5, 6 forming the sides of storage compartment 8 are "concealed" there behind front wall 7 in recess 9.

Each side wall 5, 6 is foldable such that side walls 5, 6 unfold or swing out by themselves when front wall 7 is pulled out away from back wall 9. To this end, each side wall 5, 6 has a vertically extending folding point 10 (e.g., a hinge). Likewise, side walls 5, 6 fold or swing in by themselves when front wall 7 is pushed in towards back wall 9.

As such, the front end region of cover skirt 4 can either be folded-in or folded-out relative to seat frame 2. FIG. 4 illustrates the front end region of cover skirt 4 in a folded-in position which corresponds to storage compartment 8 in the pushed-in position. FIG. 5 illustrates the front end region of cover skirt 4 in a partially folded-out position which corresponds to storage compartment 8 in the partially pulled-out position. FIG. 6 illustrates the front end region of cover skirt 4 in a fully folded-out position which corresponds to storage compartment 8 in the fully pulled-out position.

In this embodiment, a base of storage compartment 8 is formed by the floor of the passenger cell (see, for example, FIG. 7A). Alternatively, the base of storage compartment 8 is connected together with front displaceable wall 7 and cover skirt 4 such that storage compartment 8 further includes a separate, lower delimitation. This configuration provides advantages for the transportation of small objects or to account for an uneven vehicle floor. As an example, as shown in FIG. 7B, the base is a net 12 clamped between recess 9 and front wall 7 and can be pulled out. As another example, as shown in FIG. 7C, the base is a roller blind 13 which can be pulled out over front wall 7. That is, one end of roller blind 13 is fastened to front wall 7 and the other end of roller blind 13 is arranged in a magazine such that when storage compartment 8 is folded up roller blind 13 automatically retracts.

LIST OF REFERENCE NUMBERS

1 Seat
2 Seat frame
3 Seat portion
4 Cover skirt
5 First side wall of cover skirt
6 Second side wall of cover skirt
7 Front wall of cover skirt
8 Storage compartment
9 Recess (back wall) of cover skirt
10 Folding point
11 Base
12 Net
13 Roller blind While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed:

1. A vehicle comprising:

a footwell; and a front passenger seat behind the footwell, the seat having a seat frame and a cover skirt;

the seat frame having a seat portion;

the cover skirt covering the seat frame below the seat portion to thereby form a footwell termination at a front end region of the cover skirt, wherein the front end region of the cover skirt includes a pair of side walls, a front wall, and a back wall, wherein the back wall is a stationary recess of the front end region of the cover skirt, wherein the side walls and the front wall are articulately connected to one another and the side walls are foldable and coupled between the front wall and the back wall;

wherein the front wall is displaceable perpendicularly away from the back wall to a pulled-out position in which the side walls are unfolded, the front wall is away from the back wall, and the side walls, the front wall, and the back wall together form a storage compartment for storing non-litter objects intended to be reachably next to a driver of the vehicle with a floor portion of the footwell forming a floor for the storage compartment;

wherein the front wall is displaceable perpendicularly toward the back wall to a pushed-in position in which the side walls are folded and lie between the front wall and the back wall and the front wall meets the back wall.

2. The vehicle of claim 1 wherein:
the side walls and the front wall are arranged in the recess when the front wall is in the pushed-in position.

3. The vehicle of claim 1 wherein:
each side wall includes a hinge in order to fold and unfold.

4. The vehicle of claim 3 wherein:
each side wall includes a vertically running folding point in order to fold and unfold.

5. The vehicle of claim 1 further comprising:
a handle arranged on the front wall.

6. The vehicle of claim 1 further comprising:
a release mechanism on the front wall.

7. The vehicle of claim 1 wherein:
the side walls fold toward one another when folding.

8. The vehicle of claim 1 wherein:
the side walls fold away from one another when unfolding.

* * * * *